United States Patent [19]
Cohn et al.

[11] Patent Number: 5,535,134
[45] Date of Patent: Jul. 9, 1996

[54] OBJECT PLACEMENT AID

[75] Inventors: John M. Cohn, Richmond, Vt.; Fook-Luen Heng, Yorktown Heights, N.Y.

[73] Assignee: International Business Machines Corporation, Armonk, N.Y.

[21] Appl. No.: 253,898

[22] Filed: Jun. 3, 1994

[51] Int. Cl.$^6$ .................................................. G06F 17/50
[52] U.S. Cl. ...................... 364/491; 364/489; 364/490; 395/921
[58] Field of Search ........................ 364/488, 489, 364/490, 491, 578; 371/23; 395/921

[56] References Cited

U.S. PATENT DOCUMENTS

| | | | |
|---|---|---|---|
| 3,617,714 | 11/1971 | Kernigham et al. | 364/488 |
| 3,654,615 | 4/1972 | Freitag | 340/172.5 |
| 4,551,810 | 11/1985 | Levine | 364/475 |
| 4,554,625 | 11/1985 | Otten | 364/491 |
| 4,577,276 | 3/1986 | Dunlop et al. | 364/491 |
| 4,630,219 | 12/1986 | Di Giacomo et al. | 364/488 |
| 4,639,604 | 1/1987 | Murakami et al. | 250/548 |
| 4,686,629 | 8/1987 | Noto et al. | 364/491 |
| 4,754,408 | 6/1988 | Carpenter et al. | 364/491 |
| 4,805,113 | 2/1989 | Ishii et al. | 364/491 |
| 4,812,962 | 3/1989 | Witt | 364/490 |
| 4,815,003 | 3/1989 | Putatunda et al. | 364/490 |
| 4,908,772 | 3/1990 | Chi | 364/490 |
| 4,918,614 | 4/1990 | Modarres et al. | 364/489 |
| 4,922,432 | 5/1990 | Kobayashi et al. | 364/490 |
| 5,140,402 | 8/1992 | Murakata | 364/491 |
| 5,144,563 | 9/1992 | Date et al. | 364/490 |
| 5,164,907 | 11/1992 | Yabe | 364/491 |
| 5,175,696 | 12/1992 | Hooper et al. | 364/489 |
| 5,191,542 | 3/1993 | Murofushi | 364/491 |
| 5,200,908 | 4/1993 | Date et al. | 364/491 |

(List continued on next page.)

OTHER PUBLICATIONS

Tsay, R–S et al., "Proud: A Sea–Of–Gates Placement Algorithm", IEEE Design & Test of Computers, pp. 44–56, 1988.
Polak, S. D. and Tsay, R–S, "A Combined Deterministic and Random Optimization Algorithm for the Placement of Macro–Cells", Department of Electrical Engineering and Computer Sciences, University of California, Berkeley.
Flemming, U., "Wall Representations of Rectangular Dissections an Their Use in Automated Space Allocation", Environment and Planning B., vol. 5, pp., 215–232, 1978.
Flemming, U., "More on the Representation and Generation of Loosely Packed Arrangements of Rectangles", Environment and Planning B: Planning and Design, vol. 16, pp. 327–359, 1989.
Charbon, E., et al., "A Constraint–Driven Placement Methodology for Analog Itegrated Circuits", IEEE 1992 Custom Integrated Circuits Conference, pp. 28.2.1–28.2.4, 1992.

(List continued on next page.)

*Primary Examiner*—Kevin J. Teska
*Assistant Examiner*—Tyrone V. Walker
*Attorney, Agent, or Firm*—Heslin & Rothenberg; Wayne F. Reinke

[57] ABSTRACT

An existing layout is modified to ensure compliance with design rules and any user-defined rules by deriving a horizontal constraint model and a vertical constraint model. For each of the vertical and horizontal orientations in turn, violations of the rules are identified. For each orientation in turn, the violations are removed in such a way that objects in the layout are moved the least amount necessary. A given object may also be inserted into an existing layout in such a way that perturbation of objects in the existing layout is minimized by exploring solutions allowing for object merger and non-merger solutions and choosing the best one based on predetermined criteria. Given a group of objects, a layout may also be created in such a way that successive objects are placed to minimize movement of objects already placed. Placement of an object in an existing layout may also be improved by removing the object and inserting it as if it were a new object a number of times until no further improvement is noted in its placement.

16 Claims, 10 Drawing Sheets

U.S. PATENT DOCUMENTS

| | | | |
|---|---|---|---|
| 5,218,551 | 6/1993 | Agrawal | 364/489 |
| 5,222,031 | 6/1993 | Kaida | 364/491 |
| 5,224,056 | 6/1993 | Chene et al. | 364/489 |
| 5,225,991 | 7/1993 | Dougherty | 364/491 |
| 5,231,590 | 7/1993 | Kumar et al. | 364/491 |
| 5,267,176 | 11/1993 | Antreich et al. | 364/489 |
| 5,281,558 | 1/1994 | Bamji et al. | 437/250 |
| 5,303,161 | 4/1994 | Burns et al. | 364/490 |
| 5,308,798 | 5/1994 | Brasen et al. | 364/490 |
| 5,311,443 | 5/1994 | Crain et al. | 364/488 |
| 5,359,538 | 10/1994 | Hui et al. | 364/488 |
| 5,363,313 | 11/1994 | Lee | 364/489 |
| 5,416,722 | 5/1995 | Edwards | 364/491 |
| 5,420,800 | 5/1995 | Fukui | 364/491 |
| 5,430,831 | 7/1995 | Snellen | 395/921 |
| 5,465,218 | 11/1995 | Handa | 364/489 |
| 5,475,608 | 12/1995 | Masuoka | 364/491 |

OTHER PUBLICATIONS

Rijmenants, J. et al., "ILAC: An Automated Layout Tool for Analog CMOS Circuits", IEEE 1988 Custom Integrated Circuits Conference, pp. 7.6.1–7.6.4, 9188.

Rjimenants, J., et al., "ILAC: An Automated Layout Tool for Analog CMOS Circuits", IEEE Journal of Solid–State Circuits, vol. 24, No. 2, pp. 417–425, Apr. 1989.

Cohn, John, et al., "KOAN/Anagram II: New Tools for Device–Level Analog Placement and Routing", IEEE Journal of Solid–State Circuits, vol.26, No. 3, pp. 330–342, Mar. 1991.

Bar–Yehuda, R., et al., "Depth–First–Search and Dynamic Programming Algorithms for Efficient CMOS Cell Generation", IEEE Transactions on Computer–Aided Design, vol. 8, No. 7, pp. 737–743, Jul., 1989.

Uehara, T., and Van Cleemput, W., "Optimal Layout of CMOS Functional Arrays", IEEE Transactions on Computers, vol. c–30, No. 5, pp. 305–32, 1981.

Scott, W. S. and Ousterhout, J. K., "Plowing: Interactive Stretching and Compaction in Magic", IEEE 21st Design Automation Conference, Paper 11.3, pp. 66–172, 1984.

Ousterhout, J. K., Hamachi, G. T. and Mayo, R. N., "Magic: A VLSI Layout System", IEEE 21st Design Automation Conference, Paper 11.1, pp. 152–159, 1984.

OBJECT PLACEMENT AID

BACKGROUND OF THE INVENTION

1. Technical Field

The present invention generally relates to object placement. More particularly, the present invention relates to automated assistance in object placement.

2. Background Art

In areas where the arrangement of objects is a primary concern, such as in the semiconductor chip industry or the architectural industry, "manual" layout using computer design is time-consuming and has traditionally been a trial-and-error process. Constraints on the objects, such as a minimum distance between particular objects, make manual layout even more complex. The efficiency with which the layout can be modified to pursue different placement strategies defines the designer's productivity.

Attempts have been made to address the productivity issue associated with object placement design. These attempts can generally be divided into two classes, particularly in the semiconductor chip industry; fully automated object placement and symbolic entry. Fully automated object placement removes design control completely from the designer and is limited by the types of objects and design style. Symbolic entry allows the designer to design the layout in a symbolic environment without regard to constraints. The symbolic design is then globally transformed automatically into a design that conforms to the constraints, and often one which differs significantly from the ideal design in the symbolic environment. Thus, in both types of automated object placement, design control is limited or removed from the designer.

Thus, a need exists for automated assistance in object placement design where design control is maintained while the inefficiency of manual placement is avoided. A need also exists for improved automatic object placement.

SUMMARY OF THE INVENTION

Briefly, the present invention satisfies the need for efficient automated assistance in object placement design, maintaining design control by providing method and apparatus for incrementally correcting violations of placement rules in an object layout in such a way as to minimize object perturbation. Minimum perturbation is also useful in a method and apparatus for automatic object placement.

In accordance with the above, it is an object of the present invention to provide assistance in object placement.

It is another object of the present invention to ensure object placement complies with applicable object placement rules.

It is a further object of the present invention to provide assistance in placing an object in a layout such that perturbation of existing objects in the layout is minimized.

It is still a further object of the present invention to provide automated object placement.

It is still another object of the present invention to provide automated object placement in a layout such that perturbation of existing objects in the layout is minimized.

It is yet another object of the present invention to provide automated layout creation where successive objects are placed such that perturbation of objects already placed in the layout is minimized.

In a first aspect of the present invention, a method for modifying a layout of a plurality of objects to be in compliance with a plurality of predetermined rules is provided. Initially, at least one violation of the plurality of predetermined rules is identified within the layout. The layout is then modified to remove the at least one violation such that perturbation of the plurality of objects is minimized. The method of the first aspect may further comprise identifying within the layout all of the plurality of objects that are transitive due to the at least one violation. The method of the first aspect may also comprise deriving a constraint model for the layout prior to the step of identifying, where the identifying step comprises identifying within the constraint model the at least one violation and where the step of modifying comprises modifying the layout subject to the constraint model.

In a second aspect of the present invention, a method for automatically inserting an object within a layout of a plurality of objects is provided. Initially, an object for insertion into the layout is chosen. After an object is chosen, a determination is made as to whether at least one mergeable location exists within the layout for merging the chosen object with at least one of the plurality of objects. A determination is also made as to whether at least one non-mergeable location exists within the layout for inserting the chosen object within the layout. The chosen object then is automatically inserted into one of the mergeable location and the non-mergeable location such that perturbation of the plurality of objects is minimized. Optionally, a predetermined cost function can be used to determine a lowest mergeable cost location and a lowest non-mergeable cost location. If there was no mergeable location, the chosen object is automatically inserted into the lowest non-mergeable cost location, and automatically inserted into the lowest mergeable cost location if there was no non-mergeable location. If there was both a mergeable and a non-mergeable location, the lowest mergeable cost location and the lowest non-mergeable cost location are automatically compared to determine an overall lowest cost location, and the chosen object is automatically inserted into the layout in the overall lowest cost location. To create a layout rather than inserting an object in an existing layout, the method of the second aspect can be sequentially applied to a plurality of objects. To improve object placement within a layout, the method of the second aspect can be applied a number of times to an object removed from an existing layout a predetermined number of times or until a decision is made to stop.

In a third aspect of the present invention, apparatus is provided for implementing the first and second aspects. The apparatus may comprise a computer.

These, and other objects, features and advantages of this invention will become apparent from the following detailed description of the various aspects of the invention taken in conjunction with the accompanying drawings.

3

Figure 5:
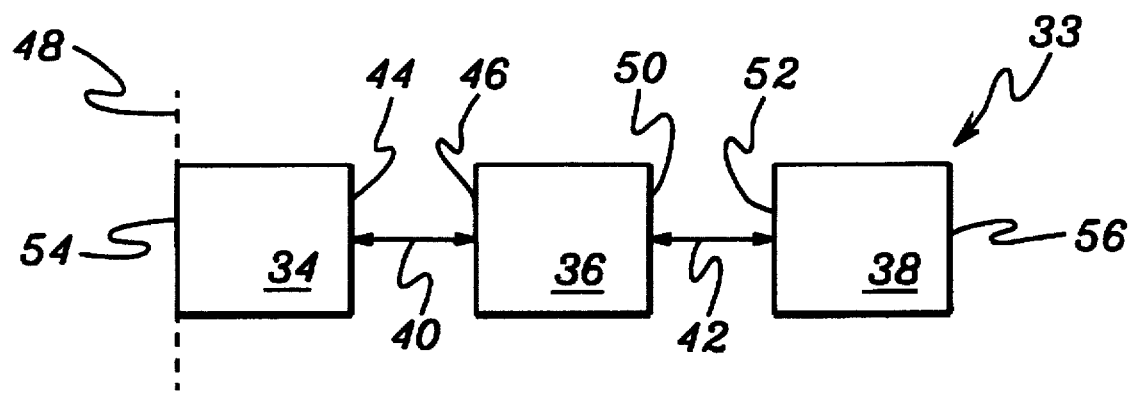

FIG. 5 is a block diagram of a layout of three objects with insufficient spacing between them.

Figure 6:
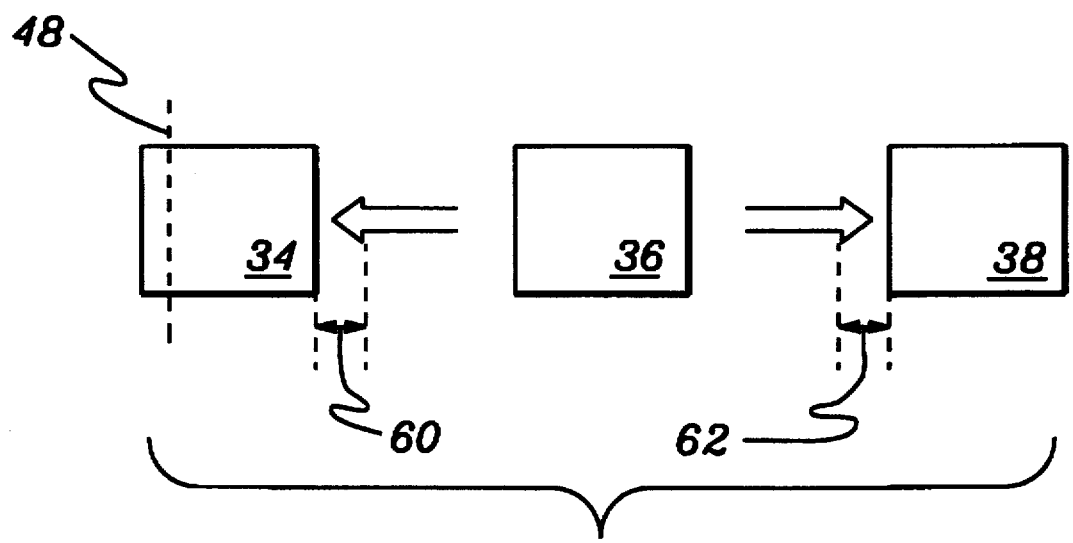

FIG. 6 is a block diagram of the layout of FIG. 5 after moving two of the objects to accommodate the third in accordance with the present invention.

Figure 7:
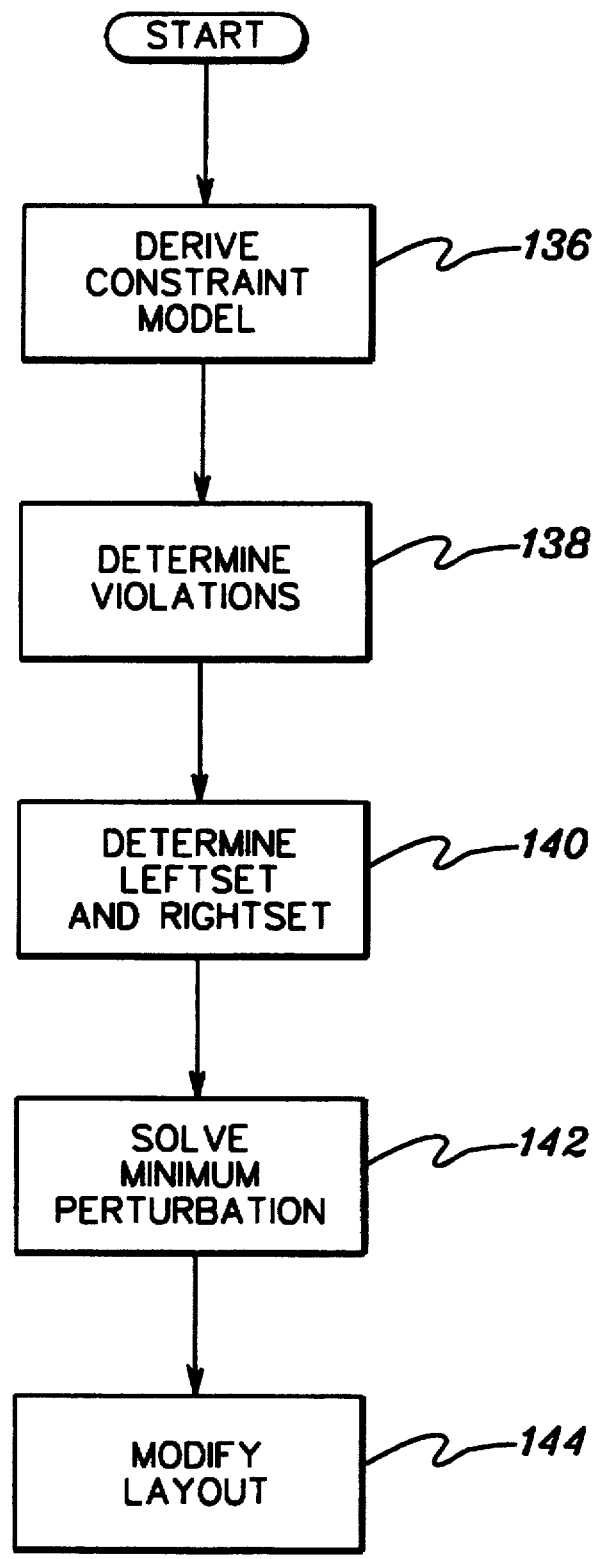

FIG. 7 is a general flow diagram for the minimum perturbation method of the first aspect of the present invention.

Figure 8:
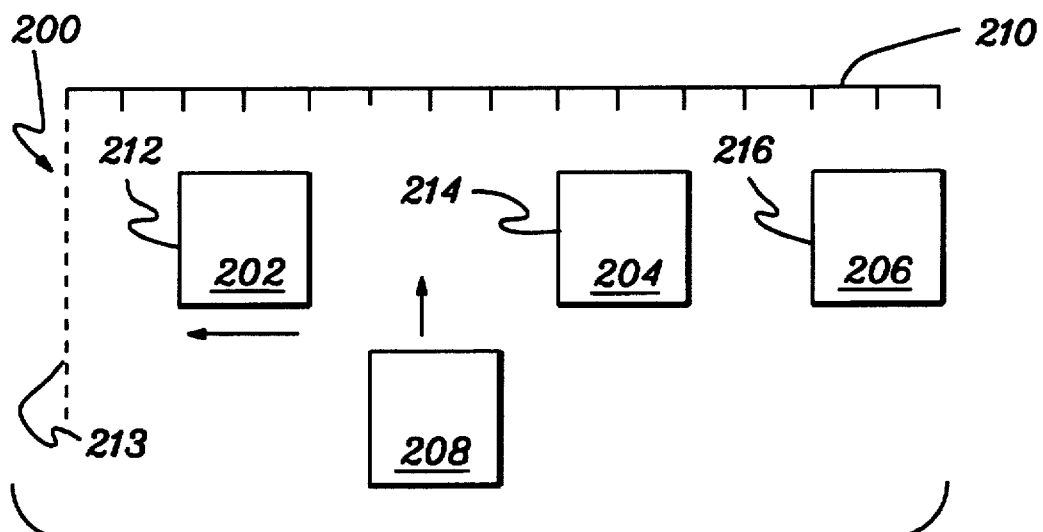

FIG. 8 is a block diagram of a layout of three objects with a fourth to be inserted between two of them.

Figure 9:
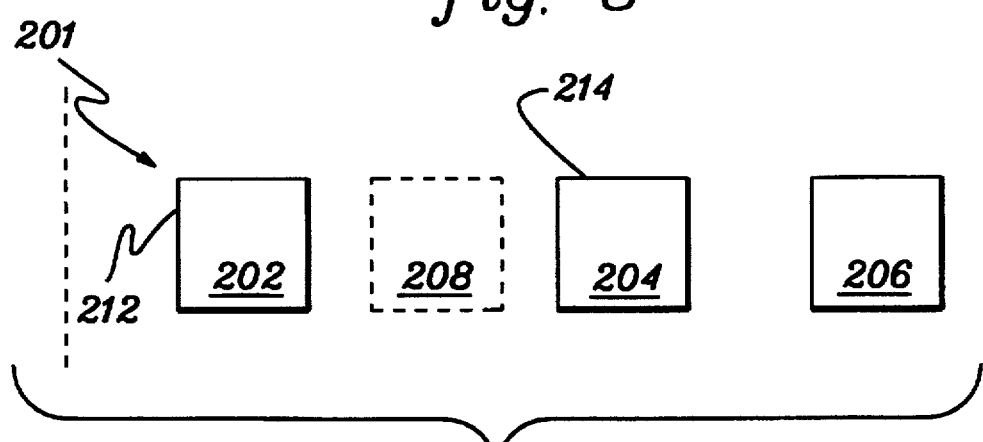

FIG. 9 is a block diagram of the layout of FIG. 8 modified to include the fourth object, resulting in design violations.

Figure 10:
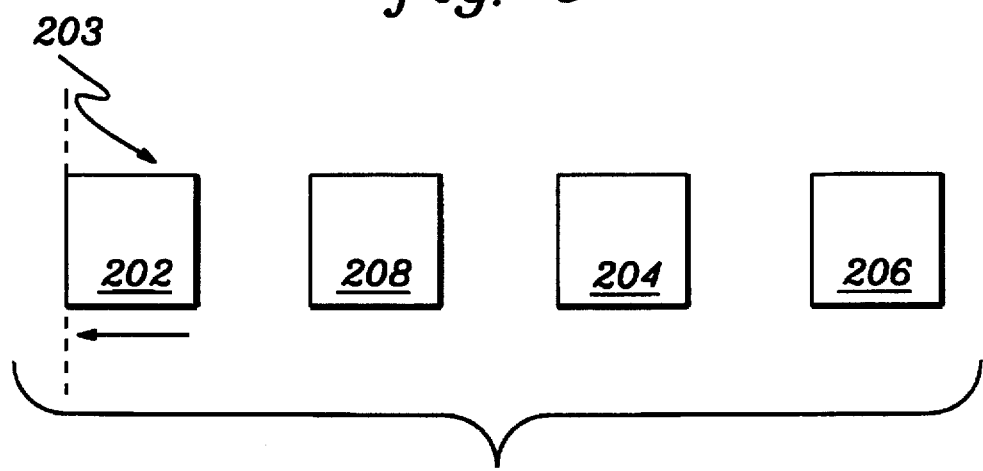

FIG. 10 is a block diagram of the layout of FIG. 9 modified to remove the design violations in accordance with the present invention.

Figure 11:
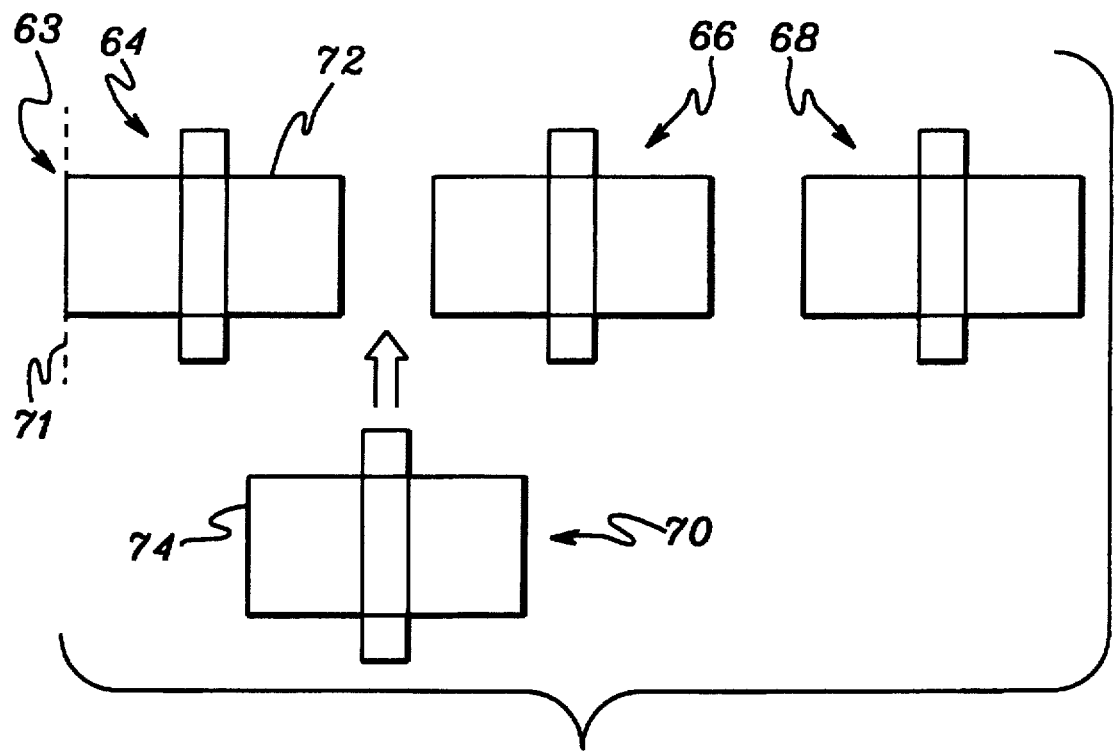

FIG. 11 is a block diagram of a layout of three transistors and a fourth to be inserted therein.

Figure 12:
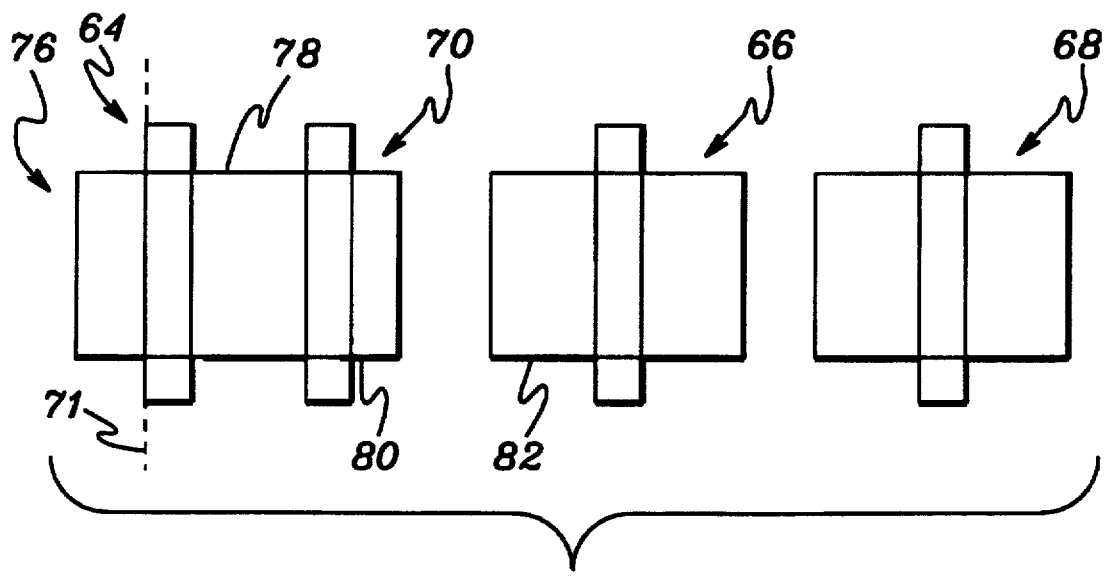

FIG. 12 is a block diagram of the layout of FIG. 11 with one of the three transistors and the fourth merged in accordance with the present invention.

Figure 13:
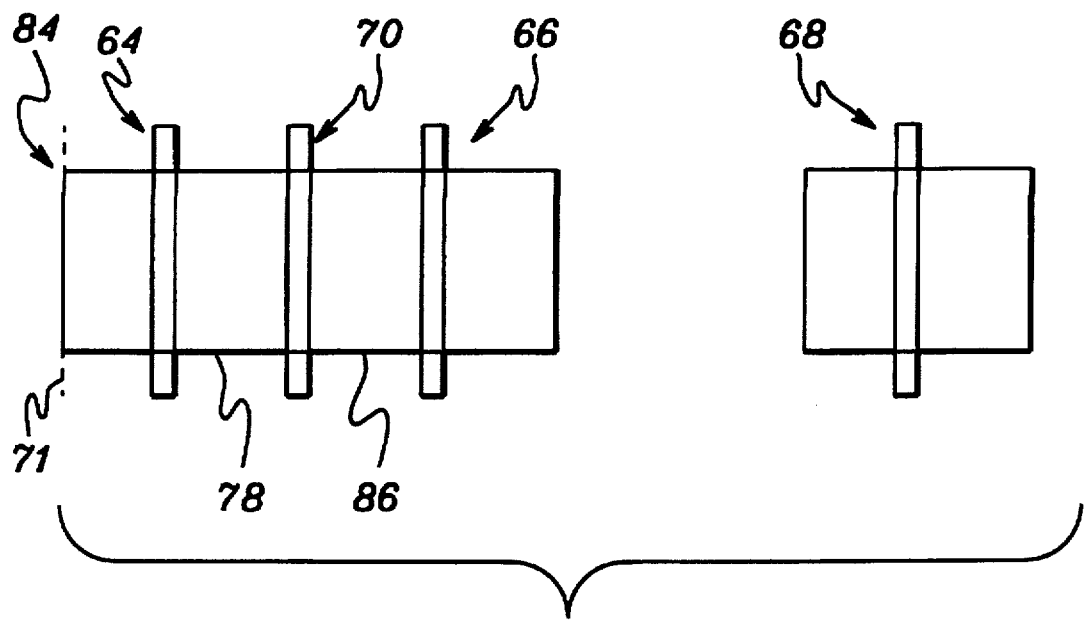

FIG. 13 is a block diagram of the layout of FIG. 11 with two of the three transistors and the fourth merged in accordance with the present invention.

Figure 14:
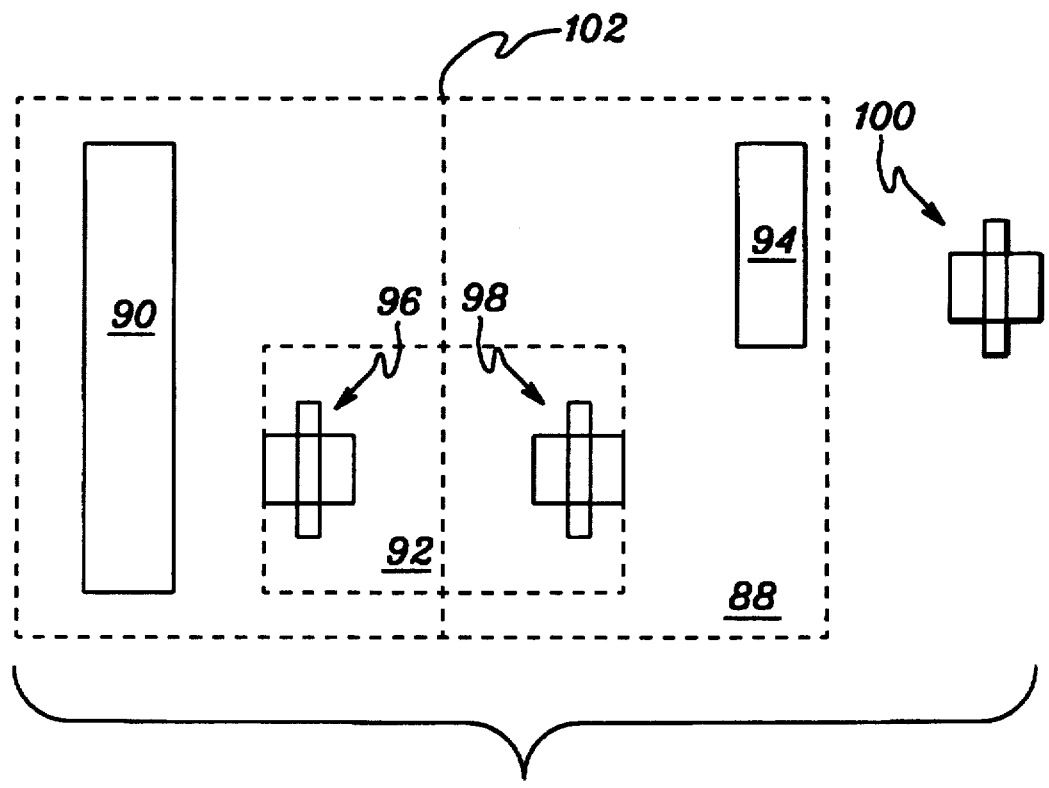

FIG. 14 is a block diagram of a hierarchical device layout and a transistor to be inserted therein.

Figure 15:
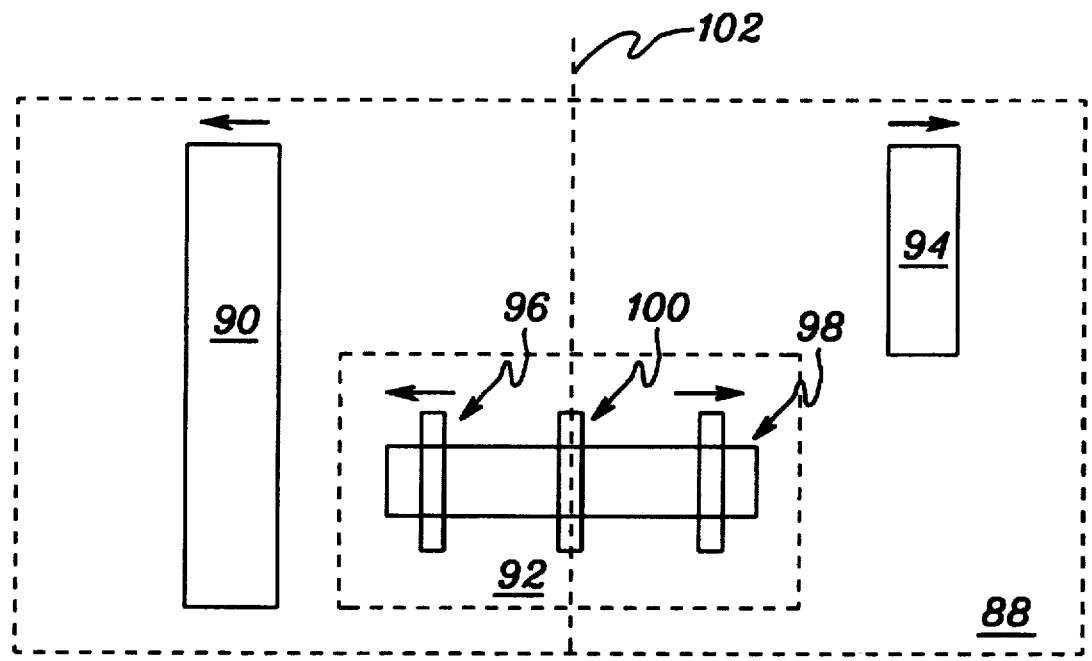

FIG. 15 is a block diagram of the hierarchical layout of FIG. 14 after insertion of the transistor in accordance with the present invention.

Figure 16:
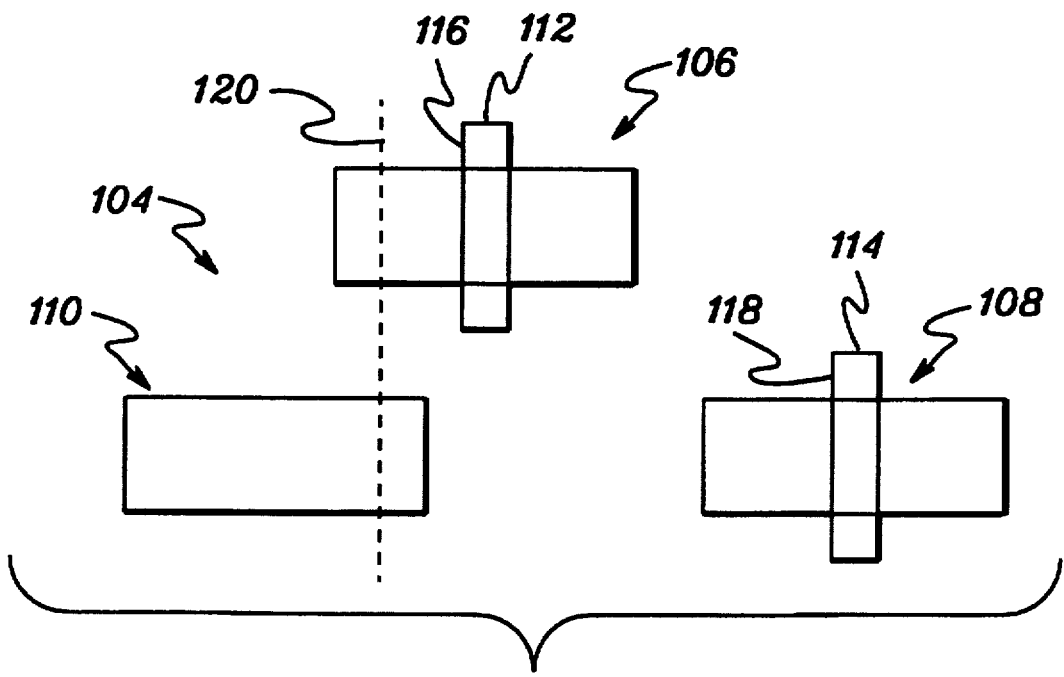

FIG. 16 is a block diagram of a layout of three integrated circuit devices prior to aligning two of them in accordance with the present invention.

Figure 17:
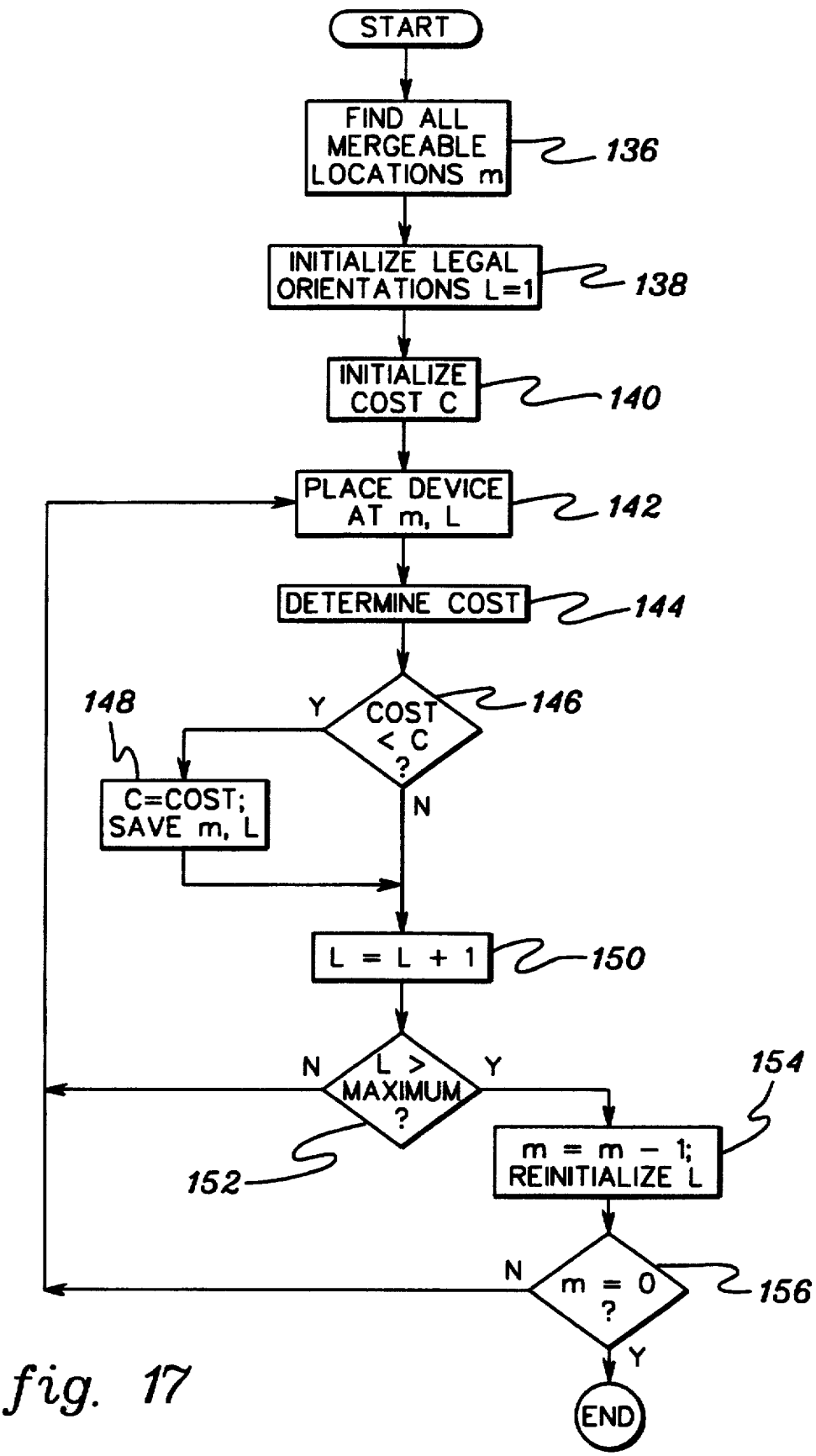

FIG. 17 is a flow diagram for a portion of the automatic global optimization technique of the second aspect.

Figure 18:
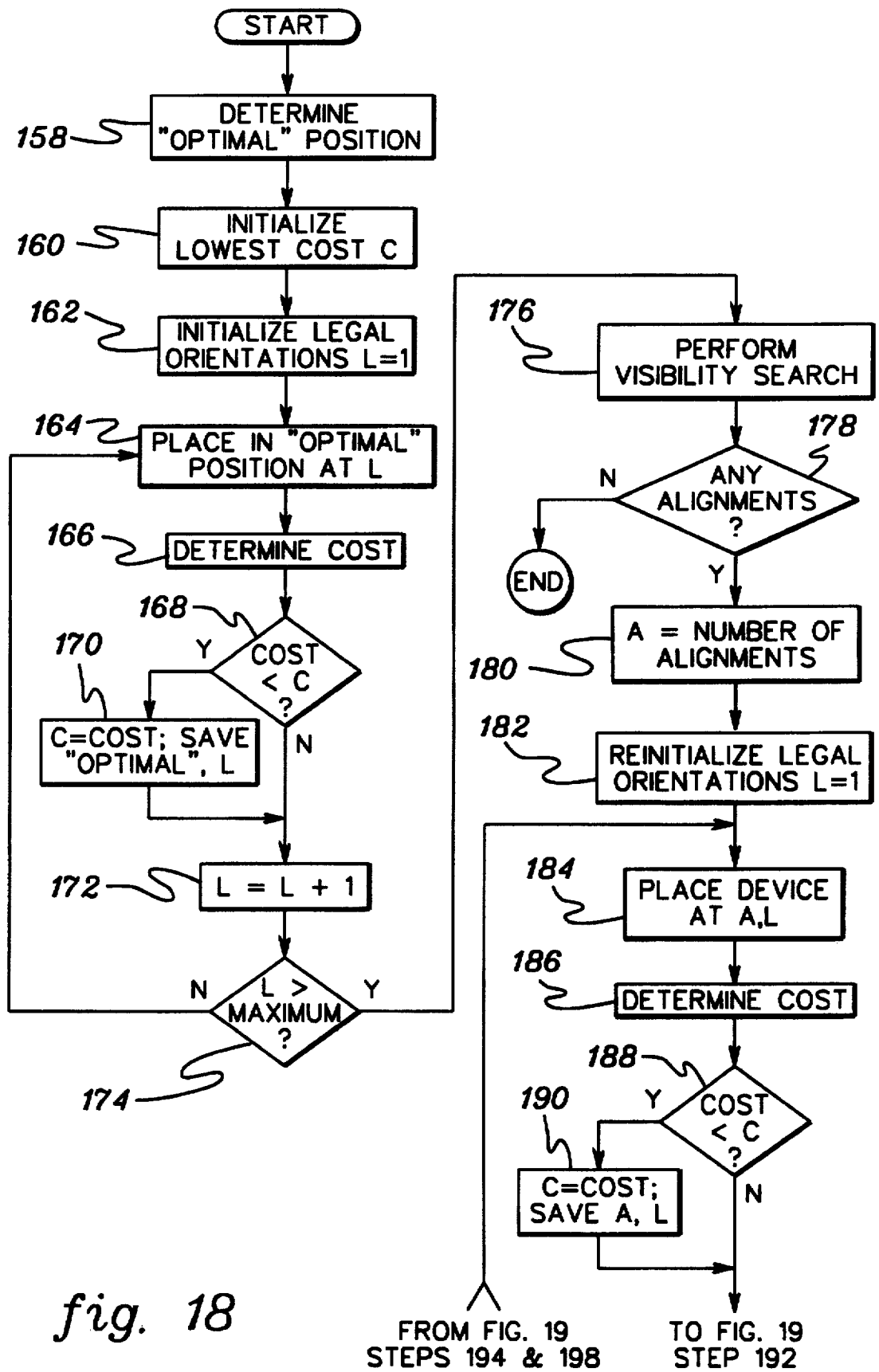
Figure 19:
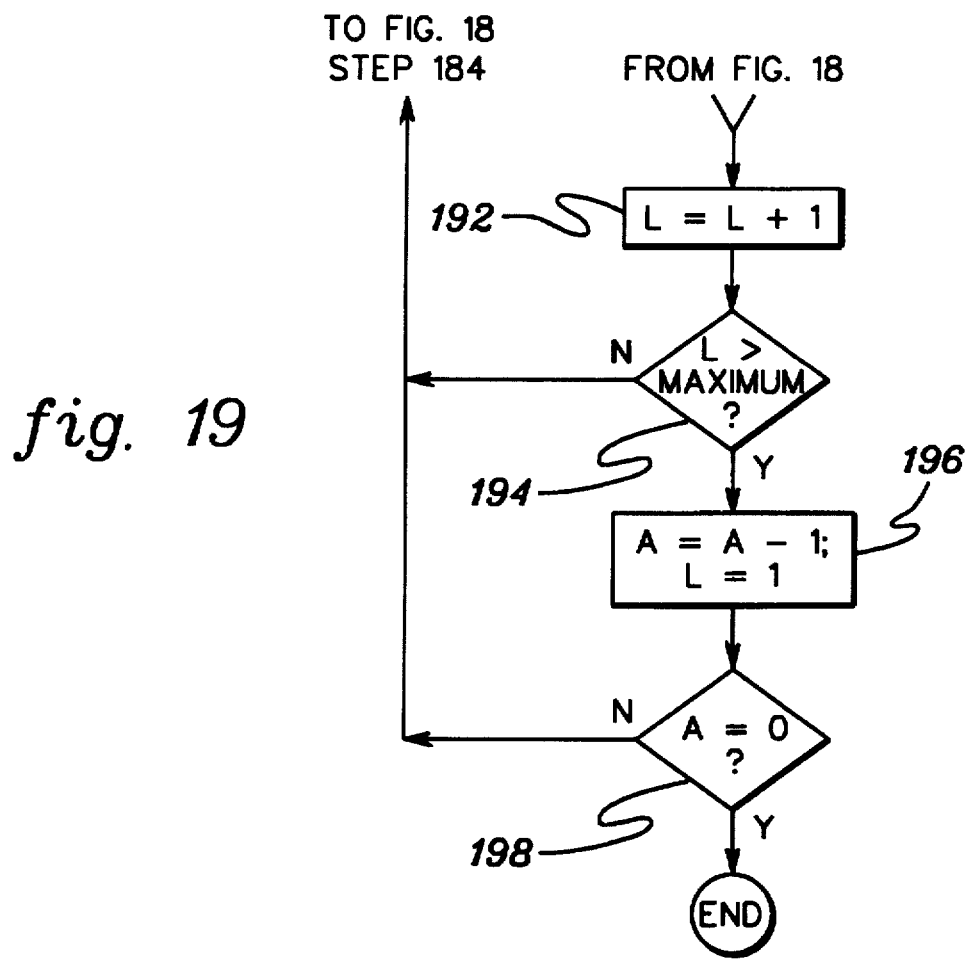

FIGS. 18 and 19 together are a flow diagram for another portion of the automatic global optimization technique of the second aspect.

Figure 20:
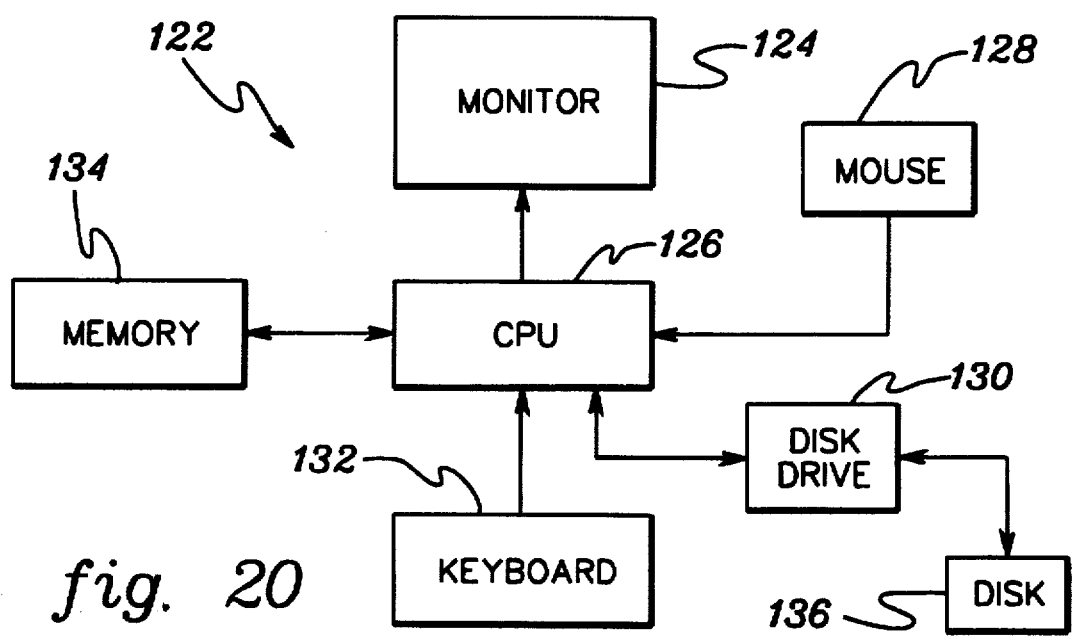

FIG. 20 is a block diagram of a workstation implementing the present invention in the form of a computer program in accordance with a third aspect.

BEST MODE FOR CARRYING OUT THE INVENTION

Attempts in the past to automate the IC design process may be divided into two approaches; fully automatic device placement and symbolic entry. Fully automatic placement has met with success in a limited class of highly structured design problems, for example, a two-row static CMOS digital circuit. However, the success of full automation diminishes dramatically with the complexity and/or customization level of the particular design. Moreover, full automation has been approached as a global optimization problem, in many cases focusing on compaction of the elements in the design to minimize the size (and, theoretically, improve the performance) thereof. As such, the end result may be quite different from what the designer had originally intended. Thus, the designer is left to modify the parameters of the automation algorithm in an attempt to bias the results of automation to come closer to the envisioned design.

Symbolic entry allows the designer to manipulate device placement (and routing) in a symbolic form, representing the individual devices as objects of representative size and wires as sticks of zero width. The designer supplies only gross topological information without concern for the actual device sizes, wire sizes or the technology design rules, such as inter-device spacing. The symbolic layout is then compacted using the actual device and wire sizes along with the design rules. As with the fully automated approach, the compaction produces unexpected results and limits designer control over the final product, requiring the addition of constraints by the designer. In addition, the symbolic approach may hide useful data from the designer critical to design decisions, such as device size.

The present invention, in a first embodiment, automates many of the tedious parts of object placement while maintaining the full flexibility of custom layout design. The automation incorporates a minimum perturbation technique that incrementally corrects the layout after each manual edit operation using the smallest possible modification. This enables the designer to explore a larger number of legal placement configurations in a given time than was previously possible. The result of the present invention is an improved layout quality and greatly enhanced designer productivity. Subsequently, the present invention will be described with reference to integrated circuit (hereinafter, "IC") design, however, it will be understood that it is meant to be applied in other areas of object placement.

In general, an IC layout comprises a list of devices, for example, transistors, their positions, fixed circuit elements in the image, such as power and ground buses, and possible movable elements attached to the devices, such as wires. For the sake of simplicity, the following exemplary description will refer to a layout consisting of only devices. However, it will be understood that it could be extended to include other circuit elements. In addition, the term "layout" will be used herein as both a list of elements and a visual representation thereof.

The present exemplary embodiment models a given device within a layout as a collection of shapes which can be manipulated as a whole, but not independently. Consider an IC device as a rectangular block with ports representing the external wiring contacts, e.g., a transistor's source, drain and gate. Each port is associated with a net attribute describing its connectivity to other ports. The ports falling on the device boundary are marked explicitly, and inter-device placement adheres to design rules by maintaining constraints between boundary edges of the devices. Positions of shapes within a device are fixed with respect to its boundary, and constraints between shapes of different devices can be translated to constraints between boundary edges of the corresponding devices.

The adjacency relations between device edges is recorded using two constraint lists, one for the horizontal relations and one for the vertical relations. Constraints for device spacing, overlap, intersection and device size are derived by traversing the relations in the lists, analogous to traversing the layout horizontally and vertically.

Figure 1:
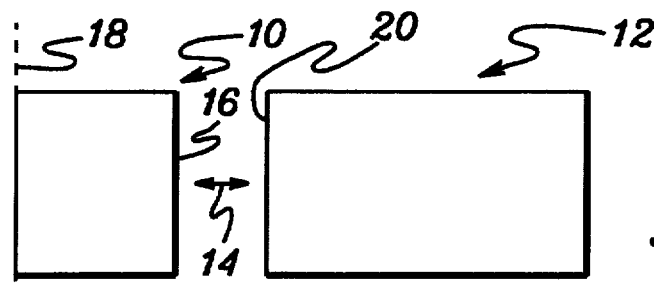
FIG. 1 is a block diagram of a layout of two objects spaced a distance apart.

FIGS. 1–4 depict the different types of horizontal relations, it being understood that the vertical are similar. FIG. 1 depicts object 10 and object 12 spaced apart by a distance 14. The position of right edge 16 of object 10 with respect to arbitrary reference 18 is denoted $x_{(10,r)}$, while the position of left edge 20 of object 12 is denoted $x_{(12,l)}$. The following spacing constraint between objects 10 and 12 is introduced to at least maintain a minimum separation distance:

$$x_{(12,l)} - x_{(10,r)} \geq \min\_{dist(10,12)};$$

where $\min\_{dist(10,12)}$ is the minimum distance allowed for that object type. If the present distance between objects 10 and 12 were to be maintained exactly, then the ">" would be removed in the above constraint.

Figure 2:
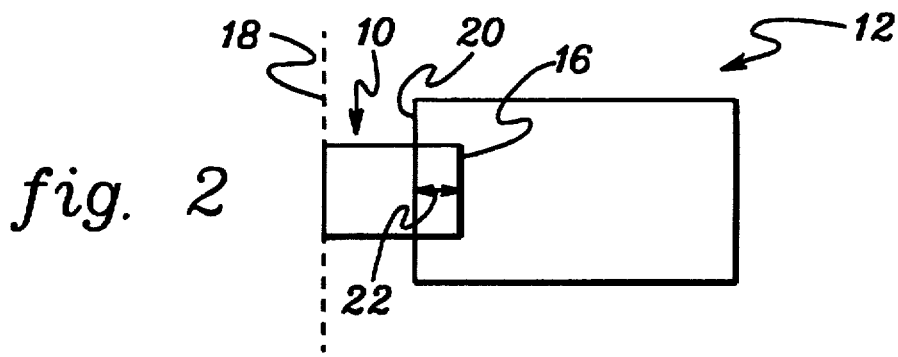
FIG. 2 is a block diagram of a layout of the objects of FIG. 1 merged together.

FIG. 2 depicts objects 10 and 12 from FIG. 1 merged together by a distance 22, denoted by merge$_{\_dist(10,12)}$. Where two objects are merged, the following constraint is introduced to at least maintain the merge:

$$x_{(10,r)} - x_{(12,l)} = \text{merge}_{\_dist(10,12)}.$$

Figure 3:
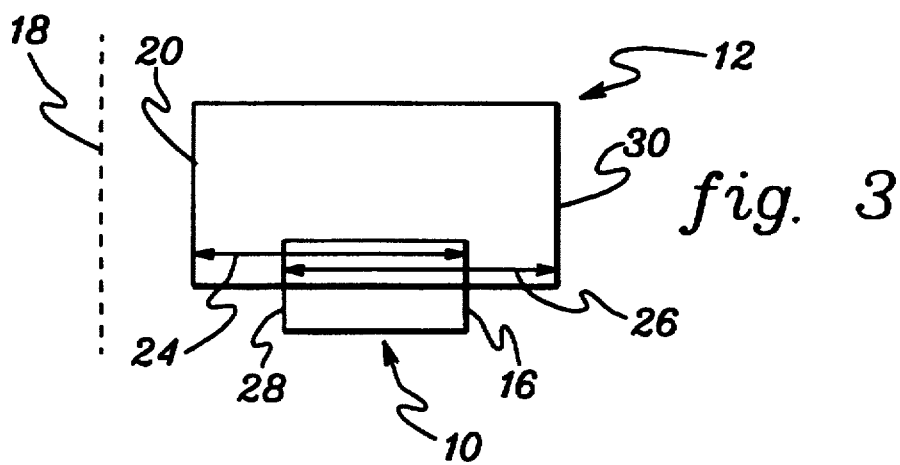
FIG. 3 is a block diagram of a layout of the objects of FIG. 1 overlapping.

FIG. 3 depicts object 10 intersected with object 12, the intersection defined by a distance 24 between the left edge 20 of object 12 and the right edge 16 of object 10, and a distance 26 between left edge 28 of object 10 and right edge 30 of object 12. Distance 24 is denoted intersection$_{\_dist1}$, and distance 26 is denoted intersection dist$_2$. To at least maintain the intersection, the following two constraints are introduced:

$$x_{(10,r)} - x_{(12,l)} \geq \text{intersection}_{\_dist1}; \text{ and}$$

$$x_{(12,r)} - x_{(10,l)} \geq \text{intersection}_{\_dist2}.$$

It should be noted that usually, two objects intersecting horizontally also intersect vertically.

Figure 4:
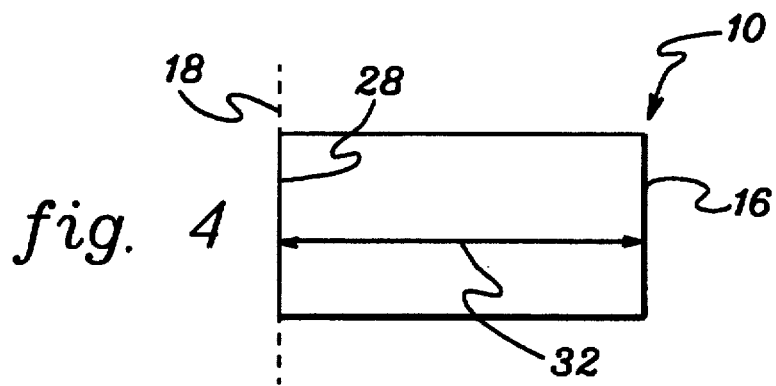
FIG. 4 is a block diagram of one of the objects of FIG. 1 showing a size constraint therefor.

FIG. 4 depicts object 10 of FIG. 1 having a distance 32 between left edge 28 and right edge 16. Distance 32 is denoted as device$_{\_size10}$. To maintain the size of object 10, the following constraint is introduced:

$$x_{(10,r)} - x_{(10,l)} = \text{device}_{\_size10}.$$

At any given point in a layout, a design rule error may exist, such as insufficient inter-object spacing. Design rule errors appear in the constraint lists as constraint violations. FIG. 5 depicts a simple layout 33 comprising generic objects 34, 36 and 38, where objects 34 and 36 are separated by a distance 40 and objects 36 and 38 are separated by a distance 42. Distance 40 can be described as the distance between left edge 46 of device 36 and right edge 44 of device 34. Edges 44 and 46 have distance values relative to arbitrary reference 48. Assume that distances 40 and 42 are insufficient, according to design rules for such objects. Thus, the following describes the violation with respect to distance 40:

$$x_{(36,l)} - x_{(34,r)} < \text{min}_{\_dist(34,36)}.$$

Similarly, the violation with respect to distance 42 can be expressed as:

$$x_{(38,l)} - x_{(36,r)} < \text{min}_{\_dist(36,38)}.$$

The end result of correcting the violations using the present invention is to modify layout 33 to comply with the design rules such that to the greatest extent possible, the movement of objects 34, 36 and 38 is minimized; that is, perturbation thereof is minimized. More specifically, the objective is to find new locations for the edges of objects 34, 36 and 38 such that the constraint violations are removed, i.e., the resulting layout is "legal" and such that a given edge is only moved if absolutely necessary. This first requires a definition for two groupings of edges that will be used.

The LEFTSET of edges is defined as the left-most edge in the right-most violation pair together with all transitive left neighbors thereof. In FIG. 5, the right-most violation pair is the right edge 50 of object 36 and the left edge 52 of object 38. In the definition of LEFTSET, "transitive" means each successive edge moving left away from edge 50 where the vertical span thereof coincides with the vertical span of the immediately previous edge. For example, if in layout 33 it was a constraint that object 34 must stay in its present location with respect to reference 48, then objects 36 and 38 would have to be moved to the right to remove the violations. In the present example, there are no such constraints. Thus, the LEFTSET contains edges 50, 46, 44 and 54.

The RIGHTSET of edges is defined as the right-most edge in the left-most violation pair together with all transitive right neighbors thereof. In FIG. 5, the left-most violation pair is the right edge 44 of object 34 and the left edge 46 of object 36. Thus, the RIGHTSET consists of edges 46, 50, 52 and 56. Note that with multiple violations in a given layout, as in the present example, it is possible for a given edge to be both in the LEFTSET and the RIGHTSET. Here, edges 46 and 50 are in both the LEFTSET and RIGHTSET.

As a final constraint, assume that edges only in the LEFTSET may move, if at all, only to the left of their present position with respect to reference 48. Here, this constraint pertains to edges 44 and 54, and is reflected in constraint (c) below. In addition, edges only in the RIGHTSET may only move, if at all, only to the right of their present position with respect to reference 48. In the present example, this constraint pertains to edges 52 and 56, and is reflected in constraint (d) below. Edges in both the LEFTSET and the RIGHTSET have no additional movement constraints (although there may be user constraints), and edges in neither set must remain in their current position.

The following formula is used in the determination of the minimum perturbation:

$$P = \Sigma |x_{(i\ new)} - x_{(i\ old)}| - \Sigma |x_{(j\ new)} - x_{(j\ old)}|,$$

where "i" denotes edges in the RIGHTSET, "j" denotes edges in the LEFTSET, "old" denotes an original position of a given edge relative to an arbitrary reference and "new" denotes a position for the given edge relative to the arbitrary reference after insertion of the object in question into the layout. The above equation can be simplified by subtracting out the constant terms to give the following:

$$P = \Sigma x_{(i)} - \Sigma x_{(j)},$$

where P is minimized, subject to the above-noted constraints, "i" is each edge in the RIGHTSET and "j" is each edge in the LEFTSET. In the present example, the problem may be described as:

Minimize $[\{x_{(38,l)} + x_{(38,r)}\} - \{x_{(34,l)} + x_{(34,4)}\}]$, subject to the following constraints:

(a) spacing constraints:

$x_{(36,l)} - x_{(34,r)} \geq \text{min}_{\_dist(34,36)};$ $x_{(38,l)} - x_{(36,r)} \geq \text{min}_{\_dist(36,38)};$ (b) size constraints:

$x_{(34,r)} - x_{(34,l)} = \text{device}_{\_size34};$ $x_{(36,r)} - x_{(36,l)} = \text{device}_{\_size36};$ $x_{(38,r)} - x_{(38,l)} = \text{device}_{\_size38};$ (c) LEFTSET constraint:

$x_{(34,l)new} <= x_{(34,l)old};$ $x_{(34,r)new} <= x_{(34,r)old};$ (d) RIGHTSET constraint:

$x_{(38,l)new} \geq x_{(38,l)old};$ and $x_{(38,r)new} \geq x_{(38,r)old}.$

FIG. 6 depicts the resultant layout 58 of minimizing P while satisfying the above system of linear constraints. It will be understood that usually in practice, a similar exercise would be performed in the vertical direction not necessary in this simplified example. As compared to FIG. 5, object 34 has been moved in FIG. 6 to the left a distance 60 and object 38 has been moved to the right a distance 62. As one skilled in the art will know, any number of techniques could be used to solve the above minimum perturbation equation subject to the above linear constraints, for example, simplex (see Papadimitrou and Steiglitz, *Combinational Optimization Algorithms and Complexity*, pgs. 25–62, Prentice Hall, 1982) or a heuristic technique such as the constraint lists used herein. Where there are multiple equivalent solutions, the method of solution will determine the outcome.

FIG. 6 and the description thereof above is a visual example of object insertion using the minimum perturbation method of the first aspect. More specifically, FIG. 7 is a flow diagram of the steps of the minimum perturbation method that begin with deriving the horizontal and vertical constraint lists (STEP 136, "DERIVE CONSTRAINT MODEL"). Then, any violations due to the device insertion are uncovered (STEP 138, "DETERMINE VIOLATIONS") by comparing the constraint lists to the design rules. From the determined violations, the LEFTSET and RIGHTSET are determined (STEP 140, "DETERMINE LEFTSET AND RIGHTSET"). The minimum perturbation equation is then solved for (STEP 142, "DETERMINE MINIMUM PERTURBATION") and, finally, the layout is modified in accordance with the solution to the minimum perturbation equation (STEP 144, "MODIFY LAYOUT").

A more detailed example of the minimum perturbation method will now be presented with reference to FIGS. 8–10. FIG. 8 is a block diagram of a layout 200 of three objects 202, 204 and 206. Assume that a fourth object 208 is to be inserted between objects 202 and 204. Each object in FIG. 8 is two units wide, according to scale 210, and the left edge 212 of object 202 is located at position 2 with respect to reference 213, the left edge 214 of object 204 is located at position 8 and the left edge 216 of object 206 is located at position 12. Assume also that the minimum allowable inter-object spacing is two units. Thus, the insertion of object 208 between objects 202 and 204 will result in a design rule violation; namely, there will only be one unit separating object 208 on either side from objects 202 and 204, if we assume that object 208 is placed mid-way between objects 202 and 204. Therefore, some horizontal movement of the objects in layout 200 will be required to accommodate object 208.

There are three possible horizontal movement scenarios to accommodate object 208. The first scenario is that objects 204 and 206 are moved one unit to the right and object 202 is moved one unit to the left. The second scenario is that object 202 remains in place, while objects 204 and 206 each move 2 units to the right, assuming we place the left edge of object 208 at position 6. The third scenario is that object 202 is moved 2 units to the left, while objects 204 and 206 remain in their current positions, assuming that the left edge of object 208 is placed at position 4. Since our goal is to move the least number of objects the least amount, in this simple example we intuitively know that the third scenario is preferred.

The results of running the above example through minimum perturbation to confirm the preferred scenario will now be discussed. FIG. 9 depicts the objects of FIG. 8 in a modified layout 201 with the fourth object inserted midway between objects 202 and 204. Traversing modified layout 201 from left to right horizontally, we first obtain a horizontal constraint model. Note that in this simplified example, there is no vertical constraint model necessary. The constraint model comprises the following entries:

(a) minimum spacing:

$\min\_dist(i,j) = 2$ (where i and j are adjacent objects);

(b) old positions:

$x_{(202,l)old} = 2$;
$x_{(202,r)old} = 4$;
$x_{(208,l)old} = 5$;
$x_{(208,r)old} = 7$;
$x_{(204,l)old} = 8$;
$x_{(204,r)old} = 10$;
$x_{(206,l)old} = 12$;
$x_{(206,r)old} = 14$;

(C) size constraints:

$x_{(202,r)} - x_{(202,l)} = 2$;
$x_{(208,r)} - x_{(208,l)} = 2$;
$x_{(204,r)} - x_{(204,l)} = 2$;
$x_{(206,r)} - x_{(206,l)} = 2$;

(d) spacing constraints:

$x_{(208,l)} - x_{(202,r)} \geq \min\_dist(202,208)$;
$x_{(204,l)} - x_{(208,r)} \geq \min\_dist(204,208)$; and
$x_{(206,l)} - x_{(204,4)} \geq \min\_dist(204,206)$.

After obtaining the constraint model, the violations are noted:

$x_{(208,l)} - x_{(202,r)} < \min\_dist(202,208)$; and $x_{(204,l)} - x_{(208,r)} < \min\_dist(204,208)$, and the LEFTSET and RIGHTSET are defined:
LEFTSET: $x_{(208,r)}$, $x_{(208,l)}$, $x_{(202,r)}$ and $x_{(202,l)}$;
RIGHTSET: $x_{(208,l)}$, $x_{(208,r)}$, $x_{(204,l)}$, $x_{(204,r)}$, $x_{(206,l)}$ and $x_{(206,r)}$.

To ensure that objects in the LEFTSET only move, if at all, to the left, that objects in the RIGHTSET move, if at all, only to the right, and that objects in both the LEFTSET and the RIGHTSET do not move, the following constraints are added:

$x_{(202,l)new} \leq x_{(202,l)old}$;

$x_{(202,r)new} \leq x_{(202,r)old}$;

$x_{(204,l)new} \geq x_{(204,l)old}$;

$x_{(204,r)new} \geq s_{(204,r)old}$;

$x_{(206,l)new} \geq x_{(206,l)old}$; and $x_{(206,r)new} \geq x_{(206,r)old}$.

Inserting the LEFTSET and RIGHTSET, the minimum perturbation equation can be expressed as:

$$P = |(x_{(204,l)new} - x_{(204,l)old}) + (x_{(204,r)new} - x_{(204,r)old}) +$$
$$(x_{(206,l)new} - x_{(206,l)old}) + (x_{(206,r)new} - x_{(206,r)old})| -$$
$$|(x_{(202,l)new} - x_{(202,l)old}) + (x_{(202,r)new} - x_{(202,r)old})|,$$

where we have values for the "old" terms and we are solving for the "new" terms to minimize P. Thus, rewriting the above equation by substituting values, we have:
$P = [(x_{(204,l)new} - 8) + (x_{(204,r)new} - 10) + (x_{(206,l)new} - 12) + (x_{*206,r)new} - 14)] - [(x_{(202,l)new} - 2) + (x_{(202,r)new} - 4)]$.

Solving the constrained linear minimum perturbation equation yields the following values for the "new" terms:

$x_{(204,l)new} = 8$;

$x_{(204,r)new} = 10$;

$x_{(206,l)new} = 12$;

$x_{(206,r)new} = 14$;

$x_{(202,l)new} = 0$; and $x_{(202,r)new} = 2$; with

P=4.

which corresponds to the third scenario previously described. This result is visually shown in FIG. 10. Solving the minimum perturbation equation for the first scenario yields P= 6, and solving it for the second scenario yields P= 8. Thus, we have indeed minimized P in the third scenario.

When used specifically with IC layout design, the present invention supports several different types of layout modifications, including insertion and deletion of a device, device merging, merged device manipulation, hierarchical placement manipulation, space insertion and deletion and structure alignment. In addition, the present invention has been found to be useful in automatic object placement, as will be described subsequently with reference to a second aspect of the invention.

In certain types of object placement, such as CMOS device placement, it is often desirable to share certain structures of connected devices to improve circuit performance and reduce the layout area required. One example of this structure sharing is the merging of the source or drain of one transistor and the source or drain of another. As one skilled in the art will know, two diffusion regions may be merged if they are of the same type, that is, they are both N-type or both P-type, and they are both connected to the same electrical net. FIG. 11 is a block diagram of a layout 63 of transistors 64, 66 and 68 spaced apart in relation to arbitrary reference 71. Assume that a constraint list exists for layout 63 and that it is desired to insert transistor 70 between devices 64 and 66. Assume also that diffusion region 72 of transistor 64 and diffusion region 74 of transistor 70 are determined to be of the same type. This can be done by listing a constraint for transistors regarding diffusion region type. After detection of the possible merge, a new constraint is added to the horizontal constraint list:

$$x_{(64,r)} - x_{(60,l)} = \text{merge}_{\text{dist}(64,70)}.$$

A new LEFTSET and RIGHTSET is then determined from spacing violations; namely, transistor 70 cannot fit in between transistors 64 and 66 without movement and/or merging. After determining the LEFTSET and RIGHTSET, the minimum perturbation equation is solved.

FIG. 12 depicts a new layout 76 from the results of solving the minimum perturbation system of linear equations. Transistors 66 and 68 have been moved to the right with respect to reference 71, transistors 64 and 70 have been merged along common diffusion region 78 and transistor 64 has been moved to the left with respect to reference 71. Preferably, the edges of diffusion regions 72 and 74 remain distinct after the merger thereof, however, merged diffusion regions 72 and 74 could be reconstrained as a single common diffusion region 78. Assuming also now that diffusion regions 80 and 82 are mergeable. In that case, depicted in FIG. 13, another constraint would be added to the horizontal constraint list:

$$x_{(60,r)} - x_{(66,l)} = \text{merge}_{\text{dist}(60,66)}.$$

If we assume it is desired to have transistor 64 remain in place, then we place transistor 70 such that it merges with transistor 64 and place transistor 66 such that it merges with transistor 70. Violations are then found and used to define LEFTSET and RIGHTSET. After solving the minimum perturbation system of linear equations, the new layout 84 is created. Transistors 66 and 68 have moved farther to the right with respect to reference 71 than in FIG. 12 and common diffusion region 86 has been created.

Once devices are merged, it may be convenient to manipulate them as a whole. To do this, we can replace separate size constraints for each of the merged devices with a new constraint defining a pseudo-device consisting of the contents of the merged devices. Instead of replacing the individual device constraints with the pseudo-device constraints, the individual constraints could be kept, but temporarily disabled until the relevant operation on the pseudo-device has been performed, such as a movement thereof to allow placement of a new device.

A similar technique can be used to manipulate objects in a hierarchical fashion so that complex nested objects may be manipulated as abstract devices. Consider a hierarchical portion 88 of a device layout, shown in FIG. 14. Hierarchical portion 88 comprises device 90, pseudo-device 92 and device 94. Pseudo-device 92 comprises transistors 96 and 98. Assume that it is desired to insert transistor 100 between devices 96 and 98, and that such insertion presents merging opportunities for device 100 with both devices 96 and 98. Device 100 is inserted, the resulting violations are found, LEFTSET and RIGHTSET are defined and the minimum perturbation equation is solved to find a placement for device 100 within pseudo device 92, which is the "sub-layout" in question at this point. The expansion of pseudo-device 92 induces spacing violations with devices 90 and 94. The technique is repeated for devices 90 and 94 with pseudo-device 92, now containing device 100, and the new minimum perturbation positions therefor are determined. FIG. 15 depicts the result of the hierarchical minimum perturbation technique, with devices 90 and 96 moving to the left with respect to reference 102, and devices 94 and 98 moving to the right with respect to reference 102. This process can be used over an arbitrary depth of hierarchy.

Another useful type of layout operation is the insertion and deletion of empty space. Space insertion may be desirable in some situations, for example, to improve routeability at the next level of hierarchy or to allow for future modifications. Inserting may be accomplished by inserting an imaginary device with the appropriate dimensions. The device insertion routine is then followed as described above.

The removal of unwanted space in a layout is accomplished by solving the minimum perturbation routine to reduce the space to the design rule minimum. As an example, assume that in FIG. 1, distance 14 is too large; that is, we want to reduce distance 14 to the minimum design rule for interdevice spacing of devices 10 and 12. Device 12 is first moved to its left-most legal position with respect to device 10. This can readily be found from the existing horizontal constraint list. Alternately, device 10 could be moved to its rightmost legal position with respect to device 12, or both devices could be moved toward one another such that inter-device spacing thereof is the legal minimum. Next, design rule violations are searched for, LEFTSET and RIGHTSET are determined and the minimum perturbation is found. This incremental removal of unwanted space allows the designer to retain much more control than global space removal methods, such as compaction.

Another useful design feature supported by the present invention is structural alignment. Consider layout 104 in FIG. 16, comprising transistor 106, transistor 108 and device 110. Assume that it is desired to align the left edge of gates 112 and 114, edges 116 and 118, respectively, along reference 120. Moving transistor 108 to the left with respect to reference 120 would require the movement of device 110. Thus, the alignment will lead to design rule violations. In order to accommodate the alignment, transistors 106 and 108 are aligned, the induced violations and LEFTSET and RIGHTSET are found and the minimum perturbation is determined.

Although the above embodiment of the present invention has been described in the first aspect as a manual IC layout aid, it also provides an excellent base for automatic global object placement, described herein with respect to Ic layout design. However, it will be understood that it could be applied to other objects and design types. In a second aspect of the invention, three types of automatic placement are supported: one-at-a-time device placement, also known as "toss"; sequential placement of all devices; and relaxation-based optimization of a completed layout. As one skilled in the art will know, sequential placement and relaxation-based optimization are both based on the toss method, thus the present invention used with the toss method will first be described.

The goal of the toss method is to automatically place a device selected by the designer optimally within the current layout. "optimally" in the present embodiment is with respect to a cost function, having three basic components, used to measure layout quality quantitatively. The first component is a merge term, designed to maximize diffusion sharing, formulated as total area of diffusion minus merged area of diffusion.

The second component is an alignment term, designed to improve density, routeability and aesthetics by encouraging appropriate structural alignments. Aligning devices within a given layout facilitates routing of wires, providing as straight a path as possible with the least number of obstacles.

The third component is a net (electrical net) cost term, designed to minimize the length of wire required to connect the placed devices, improving performance and routeability. As a practical matter, one cannot actually test different routing designs, so a routing estimator is used instead. One such exemplary estimator is a Full Geometry Minimum Spanning Tree (FGMST), as described in J. Cohn et al., *Analog Device Level Layout Automation*, Kluwer Press, Boston, 1993. The FGMST estimator seeks to determine the shortest path connecting all terminals of an electrical net. The FGMST estimator extends a basic minimum spanning tree, which one skilled in the art will already know, to take advantage of the full geometry of the connected device terminals. This FGMST estimator measures the minimum distance between a collection of shapes of any rectilinear geometry using an extension to Primm's algorithm. One skilled in the art will be familiar with Primm's algorithm.

By this method, the FGMST distance between connected terminals goes to zero when the terminals touch, i.e, merge, in any manner. Not only does this eliminate the conservative placement associated with center-measured minimum spanning trees, but it effectively allows terminal geometry to form edges in the spanning tree. This more accurately models an automated router's ability to use device terminal geometry as part of its routing path. The result is a much more accurate prediction of the routed length of the net.

Although only three components to the cost function are used herein, additional components may easily be incorporated, such as, for example, layout area and/or aspect ratio. In addition, the cost function could be weighted toward a particular component in a given situation. To automatically place a device, two classes of solutions are explored, mergeable and non-mergeable solutions. The lower cost solution from both classes is presented to the designer as the placement for the chosen device.

For mergeable solutions, the device is placed exhaustively in every location where it can be merged. At each merge location, all legal orientations of the device where a merger is possible are attempted, pushing aside other devices as necessary using the minimum perturbation method of the first aspect. Preferably, there are eight different legal orientations, although there could be more. The preferred legal orientations comprise 90 degree rotations from the horizontal with the mirror of each. For any given attempt, the cost function is evaluated and the lowest cost is tracked along with the corresponding location and orientation.

FIG. 17 is a flow diagram for the mergeable solution portion of the global placement optimization method of the second aspect. Initially, all locations where a merger is possible are identified and counted, M denoting the total number (STEP 136, "FIND ALL MERGEABLE LOCATIONS M"). A counter L tracking which legal orientation will next be used is initialized to (STEP 138, "INITIALIZE LEGAL ORIENTATIONS L"); in the present embodiment, $1<=L\leq 8$. A counter C for the cost function is also initialized to some large number (STEP 140, "INITIALIZE COST C"). After the counters are initialized, the chosen device is placed at location M in orientation L (STEP 142, "PLACE DEVICE AT M, L"). Step 142 may require for any given location or orientation, that one or more other devices are pushed aside, which is accomplished using the minimum perturbation method of the first aspect. After placing the device, the cost function is determined (STEP 144, "DETERMINE COST"). An inquiry is then made as to whether the determined cost is less than the counter C (INQUIRY 146, "COST< C?"). The arbitrarily large number that counter C was initialized to is chosen such that the first cost function determined will be stored as the current lowest cost. Alternatively, counter C could be initialized to the first cost function determined. If the determined cost is lower than C, C will be replaced with the determined cost and the location M and orientation L will be stored (STEP 148, "C=COST; SAVE M, L"). If the determined cost is not less that C, or after STEP 148, counter L is incremented for the next orientation (STEP 150, "L= L+ 1"). An inquiry is then made as to whether counter L is beyond the maximum number of legal orientations (INQUIRY 152, "L> MAXIMUM?"); here, the maximum is 8. If the maximum has not been exceeded, the routine returns to STEP 142. If the maximum has been exceeded, then M is decremented to the next merge location and L is reinitialized (STEP 154, "M=M−1; REINITIALIZE L"). Finally, an inquiry is made as to whether M has reached zero (INQUIRY 156, "M=0?"). If there are more merge locations, the routine returns to STEP 142; if there are no more merge locations, the mergeable solution routine ends.

For the non-mergeable solution, a predictor is used to find an "optimal" position for the chosen device. In the context of the present embodiment, "optimal" refers to a location likely to provide the shortest routing. The preferred method for determining the "optimal" location in IC design is a quadratic net cost, presented in Tsai et al., *PROUD: A Sea-of-Gates Placement Algorithm*, IEEE Design and Test, December, 1988. However, it will be understood that other estimators could be used. The Tsai et al. quadratic net cost can be thought of as treating each device already in an electrical net as fixed and connected to all other devices in the net by rubber bands or springs. For the chosen device being added to the net, a new rubber band is attached thereto from all the stationary devices in the net. The chosen device is then "let go" after which it comes to rest in the "optimal" location. The equation for the quadratic net cost is expressed as:

$$\text{cost}(x,y) =$$

$$\sum_{i=1}^{n} \left[ w(i) \cdot \sum_{j=1}^{p(i)} \{(x + u(i) - x(i,j))^2 + (y + v(i) - y(i,j))^2\} \right],$$

where "x" and "y" are coordinates for the terminals of the chosen device within the layout, "n" is the number of electrical nets that the chosen device will be connected to in the layout, "w(i)" is an optional weighting value set to 1 in most cases and more than 1 for particular nets considered to be critical, "p(i)" is the number of terminals placed in net i (i.e., terminals of net i belonging to devices already placed in the layout), "u(i)" and "v(i)" are coordinates for the terminals of the chosen device with respect to its center and "x(i,j)" and "y(i,j)" are coordinates for the center of placed terminal j of net i in the layout. It should also be noted that "x+u(i)" and "y+v(i)" give coordinates for the center point of terminal(s) of the chosen object connected to net i within the layout coordinate system.

An advantage of the quadratic net cost is that the minimum total wire length can be solved for exactly, since the quadratic net cost is a well-defined function, by setting the derivative of the formula to zero and solving for the length. Although the quadratic net cost yields a good starting point from where to look for the final position, it is not considered to be useful as the final location, as it is overly conservative. There would be significantly less wires (or rubber bands) used in a real IC design; not all devices would be directly electrically connected. In the non-mergeable situation, an exhaustive search for the lowest cost location is impractical, unlike the mergeable situation where there are a manageably finite number of possibilities. Therefore, the "optimal" position serves as a reasonable (though not perfect) starting point.

In the non-mergeable case, only the alignment and net cost components of the cost function need be considered. The chosen device is placed in the optimal position in all legal orientations without regard to alignment considerations, pushing aside other existing devices when necessary using the method of the first aspect. At each orientation, the cost function is determined and the lowest is tracked. A visibility search for devices in the vicinity of the optimal position are found and all possible alignments therewith are attempted along with all legal orientations at each possible alignment, with the cost function for each attempt being evaluated and the lowest tracked. The phrase "in the vicinity of" used in the preceding sentence refers to a search in all chosen directions (here, there are four—above, below, left and right) for a predetermined distance in each direction. If no devices are found within those constraints, then the current lowest cost position and orientation is returned as the final position. Finally, the lowest cost configuration among the mergeable and non-mergeable solutions is returned as the solution.

FIGS. 18 and 19 are together a flow diagram for the non-mergeable portion of global placement optimization according this second aspect. Initially, the "optimal" position is determined for the chosen device to be added to the current layout (STEP 158, "DETERMINE 'OPTIMAL' POSITION). As with the mergeable routine, the lowest cost C is initialized to a sufficiently large number (STEP 160, "INITIALIZE LOWEST COST C"), and the legal orientation counter L is initialized to 1 (STEP 162, "INITIALIZE LEGAL ORIENTATIONS L= 1"). After initializing, the device is placed in the "optimal" position at the current legal orientation L (STEP 164, "PLACE IN 'OPTIMAL' POSITION AT L"), and the cost function is evaluated (STEP 166, "DETERMINE COST"). An inquiry is then made as to whether the determined cost is less than the current lowest cost C (INQUIRY 168, "COST<C?"). If the determined cost is less than the current lowest cost, then the current lowest cost is updated and the corresponding position and orientation are saved (STEP 170, "C=COST; SAVE 'OPTIMAL' L.") If the answer to INQUIRY 168 is negative or the cost has been updated, the legal orientation counter L is incremented to the next legal orientation (STEP 172, "L= L+ 1"). Next, an inquiry is made as to whether the maximum number of legal orientations has been exceeded (INQUIRY 174, "L> MAXIMUM?"). If there are still available legal orientations, the routine returns to STEP 164. If there are no more legal orientations remaining, the visibility search is performed at the "optimal" position (STEP 176, "PERFORM VISIBILITY SEARCH") to find all possible alignments within a predetermined distance in each direction. An inquiry is made after the visibility search to determine if any alignment opportunities were discovered (INQUIRY 178, "ANY ALIGNMENTS?"). If there are no possible alignments, then the non-mergeable routine ends. If there are possible alignments, an alignment counter A is set equal to the number thereof (STEP 180, "A= NUMBER OF ALIGNMENTS"), and the legal orientations counter L is reset (STEP 182, "REINITIALIZE LEGAL ORIENTATIONS L= 1"). After setting counter A and resetting counter L, the device is placed at the location for the current alignment and orientation (STEP 184, "PLACE DEVICE AT A L") which may require that the minimum perturbation routine of the first aspect be used. After the device is placed, the cost function is determined (STEP 186, "DETERMINE COST"). An inquiry is then made as to whether the determined cost is less than the current lowest cost (INQUIRY 188, "COST< C?"). If the determined cost is less than the current lowest cost, then the current lowest cost is updated and the corresponding alignment and orientation are saved (STEP 190, "C= COST; SAVE A,L"). If the answer to INQUIRY 188 is negative or the cost has been updated, the legal orientation counter L is incremented to the next legal orientation (STEP 192, "L= L+ 1"). Next, an inquiry is made as to whether the maximum number of legal orientations has been exceeded (INQUIRY 194, "L>MAXIMUM?"). If there are still available legal orientations, the routine returns to STEP 184. If there are no more legal orientations available, the alignment counter A is decremented and L is reset (STEP 196, "A= A−1; L= 1"). An inquiry is then made as to whether there are any more possible alignment opportunities (INQUIRY 198, "A= 0?"). If there are more alignments, the routine returns to STEP 184. If there are no more alignments, the non-mergeable routine ends.

The above "toss" optimization is useful for a single device placement. To globally apply the "toss" optimization to a number of devices, sequential automatic placement is used to achieve a reasonable placement by applying toss sequentially to each device as a layout is created. The order of device placement could be selected by the designer or chosen automatically based on an arbitrary number of criteria (e.g., random ordering or connectivity). As the placement proceeds, the layout becomes more dense. Thus, although there is some level of order dependency, the push-aside features of the first aspect tend to mitigate the effects thereof. Without the minimum perturbation push-aside features, the quality of the layout would directly depend on the order in which the devices are placed, which cannot be globally known to any useful extent prior to trial placement.

To further mitigate the order-dependent effects of sequential automatic placement, an additional iterative relaxation placement phase may be added. In this phase, each device in a completed layout is subjected to the loss optimization a number of times until no further improvement is noted (based on predetermined criteria) or the designer stops the process. Conceptually, when a device is removed, either a "hole" could be left where the device was, or the hole could be filled in with the rest of the objects in the layout, for example, via compaction. In addition, whether or not the hole is left in a given situation could be an option for the designer. Preferably, the hole is left there, as this is in keeping with the goal of minimum perturbation, i.e., minimizing the movement of objects in a layout. The order in which the devices are selected may be, for example, random or, as another example, calculated by selecting the devices most distant from their "optimal" location.

In a third aspect, the present invention may readily be implemented by a computer in the nature of computer assisted design. FIG. 20 depicts a generic workstation 122, including monitor 124, central processing unit 126, mouse 128, disk drive 130, keyboard 132 and memory 134. Although the present invention embodied in a computer will be described with reference to workstation 122, it will be understood that it could be implemented on other types of computers, such as mainframes, personal computers, laptop computers or even on a network. In addition, although workstation 122 includes disk drive 130, other types of auxiliary storage may be used, such as optical storage devices. Also, the functions of keyboard 132 and mouse 128 could be accomplished by a touch screen monitor, a pen-based interactive apparatus or even with voice or other sound-based apparatus. Mouse 128 could also be replaced with some other type of pointing device, and keyboard 132 could be replaced by other types of input devices. The present invention could, for example, be implemented in a computer program on disk 136 accessed by CPU 126 via disk drive 130. The user then manipulates a layout using keyboard 132 and/or mouse 128. One skilled in the art will know how to implement the present invention in a computer program and the details of workstation 122 operation.

While several aspects of the present invention have been described and depicted herein, alternative aspects may be effected by those skilled in the art to accomplish the same objectives. In addition, while the present invention has been described with reference to integrated circuit device design, it may be used in other areas, such as, for example, printed circuit board design or architectural design. The present invention may be useful in architectural design, for example, to add rooms while minimizing perturbation of existing rooms, for panel separation in offices, or determining storage container spacing in a warehouse. As a further example, the present invention may also be useful in manufacturing processes where products are cut from sheet material. Accordingly, it is intended by the appended claims to cover all such alternative aspects as fall within the true spirit and scope of the invention.

We claim:

1. A method for modifying a layout of a plurality of objects to be in compliance with a plurality of predetermined rules, said method comprising:

identifying within said layout at least one violation of said plurality of predetermined rules, wherein each of said plurality of objects is bounded by a plurality of edges;

identifying a first group of edges as all transitive edges beyond said at least one violation closest to a predetermined reference in a direction away from said predetermined reference;

identifying a second group of edges as all transitive edges beyond said at least one violation furthest away from said predetermined reference in a direction toward said predetermined reference; and modifying said layout to remove said at least one violation such that perturbation, resulting from said modifying, of said plurality of objects is minimized, wherein said perturbation is a function of the sum of the distances of the edges in said first group of edges from the predetermined reference and the sum of the distances of the edges in said second group of edges from said predetermined reference.

2. The method of claim 1 wherein said plurality of predetermined rules comprises a minimum spacing between at least two objects in said plurality of objects.

3. The method of claim 1 wherein said plurality of predetermined rules comprises criteria for merging at least two of said plurality of objects.

4. The method of claim 1 wherein said plurality of predetermined rules comprises criteria for overlapping at least two of said plurality of objects.

5. The method of claim 1 wherein said plurality of predetermined rules comprises an object size.

6. The method of claim 1 wherein said step of modifying is performed first from one of a horizontal orientation and vertical orientation and second from the other of said horizontal orientation and vertical orientation.

7. The method of claim 1 wherein said plurality of objects comprises a plurality of integrated circuit devices.

8. The method of claim 1 further comprising deriving a constraint model for said layout prior to said first step of identifying, wherein said first step of identifying comprises identifying within said constraint model said at least one violation and wherein said step of modifying comprises modifying said layout subject to said constraint model.

9. The method of claim 8, wherein each of said plurality of objects is bounded in a first orientation by a first edge and a second edge opposite said first edge and bounded in a second orientation perpendicular to said first orientation by a third edge and a fourth edge opposite said third edge and wherein said step of deriving comprises determining for each said orientation a position for each edge of each of said plurality of objects relative to a predetermined reference.

10. The method of claim 9, wherein said step of modifying for each said orientation comprises minimizing perturbation P in the following equation, subject to said plurality of predetermined rules and said constraint model:

$$P = \Sigma\ x_{(i)new} - \Sigma\ x_{(j)new},$$

wherein $$\Sigma\ x_{(i)new} \geq \Sigma\ x_{(i)old}\ \text{and}$$

$$\Sigma\ x_{(j)new} <= \Sigma\ x_{(j)old},$$

wherein $x_{(i)}$ comprises a position for a given edge in said first group of edges relative to said predetermined reference, wherein $x_{(j)}$ comprises a position for a given edge in said second group of edges relative to said predetermined reference, wherein "new" denotes a position for said given edge relative to said predetermined reference as a result of said step of minimizing and wherein "old" denotes a position for said given edge relative to said predetermined reference prior to said step of minimizing.

11. A method for automatically modifying a layout of a plurality of objects to ensure compliance with a plurality of predetermined rules, said method comprising:

modifying said layout without regard to said plurality of predetermined rules;

automatically identifying within said layout any violations of said plurality of predetermined rules, wherein each of said plurality of objects is bounded by a plurality of edges;

automatically identifying a first group of edges as all transitive edges beyond said at least one violation closest to a predetermined reference in a direction away from said predetermined reference;

automatically identifying a second group of edges as all transitive edges beyond said at least one violation furthest away from said predetermined reference in a direction toward said predetermined reference; and automatically modifying said layout to remove said any violations such that perturbation, resulting from said modifying, of said plurality of objects is minimized, wherein said perturbation is a function of the sum of the distances of the edges in said first group of edges from the predetermined reference and the sum of the distances of the edges in said second group of edges from said predetermined reference.

12. The method of claim 11 further comprising automatically deriving a constraint model for said layout prior to said first step of automatically identifying, wherein said first step of automatically identifying comprises automatically identifying within said constraint model said any violations and wherein said step of automatically modifying comprises automatically modifying said layout subject to said constraint model.

13. A system for modifying a layout of a plurality of objects to be in compliance with a plurality of predetermined rules, said system comprising:

means for identifying within said layout at least one violation of said plurality of predetermined rules, wherein each of said plurality of objects is bounded by a plurality of edges;

means for identifying a first group of edges as all transitive edges beyond said at least one violation closest to a predetermined reference in a direction away from said predetermined reference;

means for identifying a second group of edges as all transitive edges beyond said at least one violation furthest away from said predetermined reference in a direction toward said predetermined reference; and means for modifying said layout to remove said at least one violation such that perturbation, resulting from said modifying, of said plurality of objects is minimized, wherein said perturbation is a function of the sum of the distances of the edges in said first group of edges from the predetermined reference and the sum of the distances of the edges in said second group of edges from said predetermined reference.

14. The system of claim 13 further comprising means for deriving a constraint model for said layout.

15. The system of claim 14, wherein said modifying means comprises means for minimizing perturbation P in the following equation, subject to said plurality of predetermined rules and said constraint model:

$$P = \Sigma\, x_{(i)new} - \Sigma\, x_{(j)new},$$

wherein $$\Sigma\, x_{(i)new} \geq \Sigma\, x_{(i)old} \text{ and}$$

$$\Sigma\, x_{(j)new} <= \Sigma\, x_{(j)old},$$

wherein $x_{(i)}$ comprises a position for a given edge in said first group of edges relative to said predetermined reference, wherein $x_{(j)}$ comprises a position for a given edge in said second group of edges relative to said predetermined reference, wherein "new" denotes a position for said given edge relative to said predetermined reference as a result of said minimizing and wherein "old" denotes a position for said given edge relative to said predetermined reference prior to said minimizing.

16. A system for automatically modifying a layout of a plurality of objects to ensure compliance with a plurality of predetermined rules, said system comprising:

means for modifying said layout without regard to said plurality of predetermined rules, wherein each of said plurality of objects is bounded by a plurality of edges;

means for automatically identifying within said layout any violations of said plurality of predetermined rules;

means for identifying a first group of edges as all transitive edges beyond said at least one violation closest to a predetermined reference in a direction away from said predetermined reference;

means for identifying a second group of edges as all transitive edges beyond said at least one violation furthest away from said predetermined reference in a direction toward said predetermined reference; and means for automatically modifying said layout to remove said any violations such that perturbation, resulting from said modifying, of said plurality of objects is minimized, wherein said perturbation is a function of the sum of the distances of the edges in said first group of edges from the predetermined reference and the sum of the distances of the edges in said second group of edges from said predetermined reference.

* * * * *

UNITED STATES PATENT AND TRADEMARK OFFICE
CERTIFICATE OF CORRECTION

PATENT NO. : 5,535,134

DATED : July 9, 1996

INVENTOR(S) : Cohn, et al

Page 1 of 2

It is certified that error appears in the above-indentified patent and that said Letters Patent is hereby corrected as shown below:

Column 4
Line 65, substitute --min__dist$_{(10,12)}$;-- for "min___$_{dist(10,12)}$;"
Line 66, substitute --min__dist$_{(10,12)}$) - for "min___$_{dist(10,12)}$"

Column 5
Line 08, substitute --merge__dist$_{(10,12)}$-- for "merge___$_{dist(10,12)}$"
Line 17, substitute --intersection__dist$_1$,-- for "intersection___$_{dist1}$"
Line 20, substitute --intersection__dist$_2$,-- for "intersection___$_{dist2}$"
Line 28, substitute --device__size$_{10}$-- for "device___$_{size10}$"
Line 43, substitute --min__dist$_{(34,36)}$ -- for "min___$_{dist(34,36)}$)."
Line 48, substitute --min__dist$_{(36,38)}$ -- for "min___$_{dist(36,38)}$)."

Column 6
Line 48, substitute --min__dist$_{(34,36)}$;-- for "min___$_{dist(34,36)}$;"
Line 49, substitute --min__dist$_{(36,38)}$;-- for "min___$_{dist(36,38)}$;"
Line 51, substitute --device__size$_{34}$;-- for "device___$_{size34}$;"
Line 52, substitute --device__size$_{36}$;-- for "device___$_{size36}$;"
Line 53, substitute --device__size$_{38}$;-- for "device___$_{size38}$;"

Column 7
Line 64, substitute --min___dist$_{(i,j)}$-- for "min___$_{dist(i,j)}$"

Column 8
Line 12, substitute --min___dist$_{(202,208)}$-- for "min___$_{dist(202,208)}$"
Line 13, substitute --min___dist$_{(204,208)}$-- for "min___$_{dist(204,208)}$"
Line 14, substitute --min___dist$_{(204,206)}$-- for "min___$_{dist(204,206)}$"
Line 18, substitute --min___dist$_{(202,208)}$-- for "min___$_{dist(202,208)}$"
Line 20, substitute --min___dist$_{(204,208)}$-- for "min___$_{dist(204,208)}$"

UNITED STATES PATENT AND TRADEMARK OFFICE
CERTIFICATE OF CORRECTION

PATENT NO. : 5,535,134
DATED : July 9, 1996
INVENTOR(S) : Cohn, et al

Page 2 of 2

It is certified that error appears in the above-indentified patent and that said Letters Patent is hereby corrected as shown below:

Column 9
Line 35, substitute --merge___dist_(64,70)-- for "merge___*(64,70)*"
Line 55, substitute --merge___dist_(70,66)-- for "merge___*(70,66)*"

Signed and Sealed this

Fourth Day of February, 1997

Attest:

BRUCE LEHMAN

*Attesting Officer*    *Commissioner of Patents and Trademarks*